United States Patent [19]
Eckl et al.

[11] Patent Number: 5,331,173
[45] Date of Patent: Jul. 19, 1994

[54] SYSTEM AND METHOD FOR INDICATING THE LOCATION OF A BENCHMARK

[75] Inventors: John K. Eckl, Brookfield; John L. Lorenzo, Southbury, both of Conn.

[73] Assignee: Pitney Bowes Inc., Stamford, Conn.

[21] Appl. No.: 996,286

[22] Filed: Dec. 24, 1992

[51] Int. Cl.⁵ .................................................. G06K 5/00
[52] U.S. Cl. ...................................... 250/556; 235/474
[58] Field of Search .............. 250/556, 561, 566, 568; 235/438, 474, 466, 470, 463; 382/46, 59; 364/478, 471

[56] References Cited

U.S. PATENT DOCUMENTS

| | | | |
|---|---|---|---|
| 2,687,253 | 8/1954 | McMillan | 235/61.11 |
| 2,897,370 | 7/1959 | Sauter | 250/219 |
| 2,904,700 | 9/1959 | Rockey | 250/225 |
| 2,946,992 | 7/1960 | Broido | 340/259 |
| 3,361,896 | 1/1968 | Antonio | 235/61.11 |
| 3,502,850 | 3/1970 | Lindquist et al. | 250/556 |
| 3,531,649 | 9/1970 | Sather | 250/219 |
| 3,588,086 | 6/1971 | Bell | 270/58 |
| 3,613,975 | 10/1971 | Knight | 226/25 |
| 3,628,031 | 12/1971 | Azure, Jr. | 250/219 DC |
| 3,692,983 | 9/1972 | Cucciati et al. | 235/61.11 E |
| 3,820,068 | 6/1974 | McMillin | 340/146.3 AG |
| 3,961,781 | 6/1976 | Funk | 270/20 |
| 4,072,859 | 2/1978 | McWaters | 250/568 |
| 4,147,295 | 4/1979 | Nojiri et al. | 235/463 |
| 4,162,408 | 7/1979 | Hansen | 250/555 |
| 4,230,265 | 10/1980 | Casaly | 235/455 |
| 4,243,876 | 1/1981 | Engel et al. | 235/455 |
| 4,266,123 | 5/1981 | Friberg | 250/205 |
| 4,364,062 | 12/1982 | Matsui | 346/75 |
| 4,600,841 | 7/1986 | Tokuno et al | 250/548 |
| 4,857,745 | 8/1989 | Gough | 250/548 |
| 4,864,631 | 9/1989 | Jensen | 382/61 |
| 5,021,674 | 6/1991 | Brunner | 250/561 |

Primary Examiner—David C. Nelms
Assistant Examiner—Que T. Le
Attorney, Agent, or Firm—Charles R. Malandra, Jr.; Melvin J. Scolnick

[57] ABSTRACT

A method of initializing an optical scanning system by centering a benchmark code in an electrically adjustable benchmark window, the benchmark code being scanned by the optical scanning system while being transported through a paper handling machine. The improvement comprises the steps of providing an encoder for timing the machine cycles of the paper handling machine as a plurality of documents are processed therethrough; conveying a document containing a benchmark code to be scanned past a scanning device of the optical scanning system; enabling a counter at the lead edge of the electrically adjustable benchmark window; incrementing the counter once for every two encoder pulses; disabling the counter when the scanning device detects the benchmark code; displaying the count of the counter in a LED display; and adjusting the location of the benchmark window so that the benchmark code is substantially centered in the benchmark window based on the count displayed on the LED display.

4 Claims, 2 Drawing Sheets

SYSTEM AND METHOD FOR INDICATING THE LOCATION OF A BENCHMARK

FIELD OF THE INVENTION

The invention disclosed herein relates generally to optical scanning devices, and more particularly to optical scanning devices scanning control codes on passing documents.

BACKGROUND OF THE INVENTION

In scanning codes, such as bar codes or dash codes, on a moving sheet of paper, it is critical that 100 percent of the code is read by the optical scanning system. Typically, an optical scanning system opens a detection "window" at a predetermined time after the leading edge of the moving sheet of paper is detected. A detection window is a system controlled location on the sheet of paper where the optical scanning system actively scans to detect the control code. For optical scanning systems including dash code scanners, it is desired that the first dash of the dash code on each sheet of paper is located at or near the center of the detection window. This ensures that 100 percent of the code will be detected by the system. An example of an optical scanning system for scanning dash codes is disclosed in U.S. Pat. No. 4,659,939, issued to John L. Lorenzo on Apr. 21, 1987 and assigned to the assignee of the present invention, which is incorporated herein by reference.

Generally, the codes being scanned are located at the same location on each of the sheets containing the code. Thus, an optical scanning system with a dash code scanner must be initialized to position the detection window so that the first code mark on the sheet is approximately at the center of the detection window. Heretofore, such dash code scanners have been initialized, or set up, by a service technician using a oscilloscope or a logic analyzer. Thus, whenever the code is printed at another location on the sheet or the optical scanning system goes out of tolerance, e.g., too many scan errors occur, it is necessary to initialized the system again to ensure that the first scan mark is centered in the detection window. Again, a service technician is needed for this.

It is an object of the present invention to provide a system and method which simplifies the initialization of the optical scanning system.

It is a further object of the present invention to provide a system and method of initialization of the optical scanning system which does not require a service technician to complete.

SUMMARY OF THE INVENTION

It has been found that the present invention provides an instantaneous visual indication of the benchmark dash relative to the benchmark window. Such a visual indication of the relative position of the benchmark simplifies the initialization, or setup, of the scanning device. In particular, the present invention eliminates the need for a a logic analyzer or scope, typically requiring a technician to perform the initialization.

In accordance with the present invention, a method is provided for initializing an optical scanning system by centering a benchmark code in an electrically adjustable benchmark window. The benchmark code is part of a control code printed on a document being scanned by the optical scanning system while the document is transported through a paper handling machine. The improvement comprises the steps of providing an encoder for timing the machine cycles of the paper handling machine as a plurality of documents are processed therethrough; conveying a document containing a benchmark code to be scanned past a scanning device of the optical scanning system; enabling a counter at the lead edge of the electrically adjustable benchmark window; incrementing the counter once for every two encoder pulses; disabling the counter when the scanning device detects the benchmark code; displaying the count of the counter in a LED display; and adjusting the location of the benchmark window so that the benchmark code is substantially centered in the benchmark window based on the position displayed on the LED display.

In an optical scanning system including a dash code scanner for scanning a benchmark code printed on a document being transported through a paper handling machine, an improvement to initializing the optical scanning system relative to the location of the benchmark code in an electrically adjustable benchmark window, the improvement comprises means for generating a first signal beginning at the lead edge of the benchmark window and ending at the detection of the benchmark code by the dash code scanner; means for deriving a count indicative of a number of machine cycles between the lead edge of the benchmark window and the benchmark code; and means for displaying said count on an LED display.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
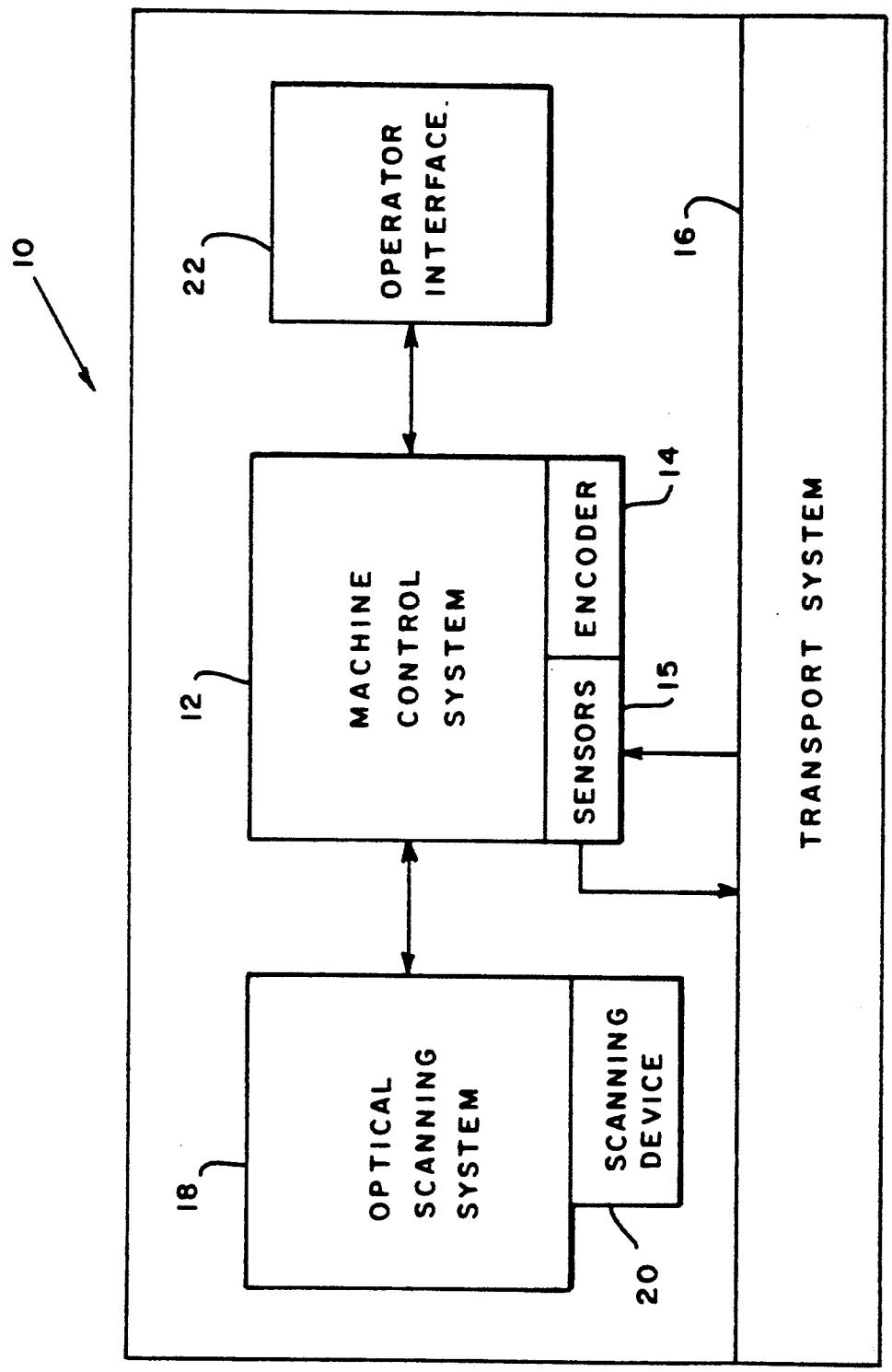
FIG. 1 is a generalized block diagram of a paper handling machine including an optical scanning system.

In describing the present invention, reference is made to the drawings, wherein there is seen in FIG. 1 a block diagram of a paper handling machine, generally designated 10, including a machine control system 12 and an optical scanning system 18. The machine control system 12 includes an encoder 14 which generates timing pulses during machine operation. The machine control system 12 also includes sensors 15 for sensing movement of documents conveyed by a transport system 16. The optical scanning system 18 controls a scanning device 20 which scans coded information printed on the documents conveyed by transport system 16 and sends such information to the machine control system 12. There is an operator interface 22 which provides a machine operator means for monitoring and inputting operational information and operator commands respectively.

An example of the paper handling machine is an inserting machine. See, for example, U.S. Pat. No. 4,547,856, which is incorporated herein by reference for the purpose of general inserting machine control system operation.

Figure 2:
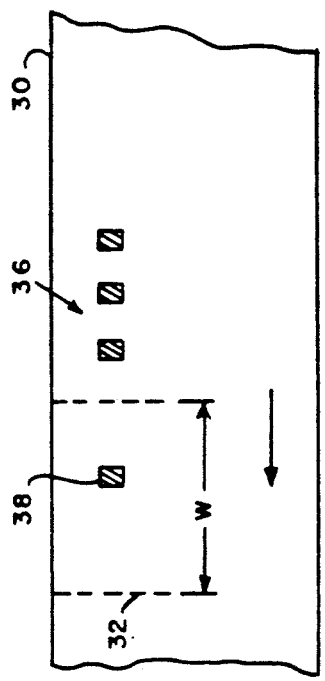
FIG. 2 is a plan view of a document being scanned for control marks.

Referring now to FIG. 2, a document 30, which is moving left to right as shown by the arrow in FIG. 2, has a control code 36 printed thereon. The scanning device 20 (not shown in FIG. 2) begins an active scan of document 10 at a predetermined location 32 on document 30. Typically, this location is determined by one of sensors 15 sensing the leading edge of the document and the counting a specific number of encoder pulses from the leading edge. The scanning device 20 continues to scan for the control code 36 for a predetermined distance from location 32. The length of the active scan relative to a particular position on document 30 is referred to as a detection window W, also referred to as a benchmark window. The benchmark window is the window in which the scanner is scanning for a mark.

Figure 3:
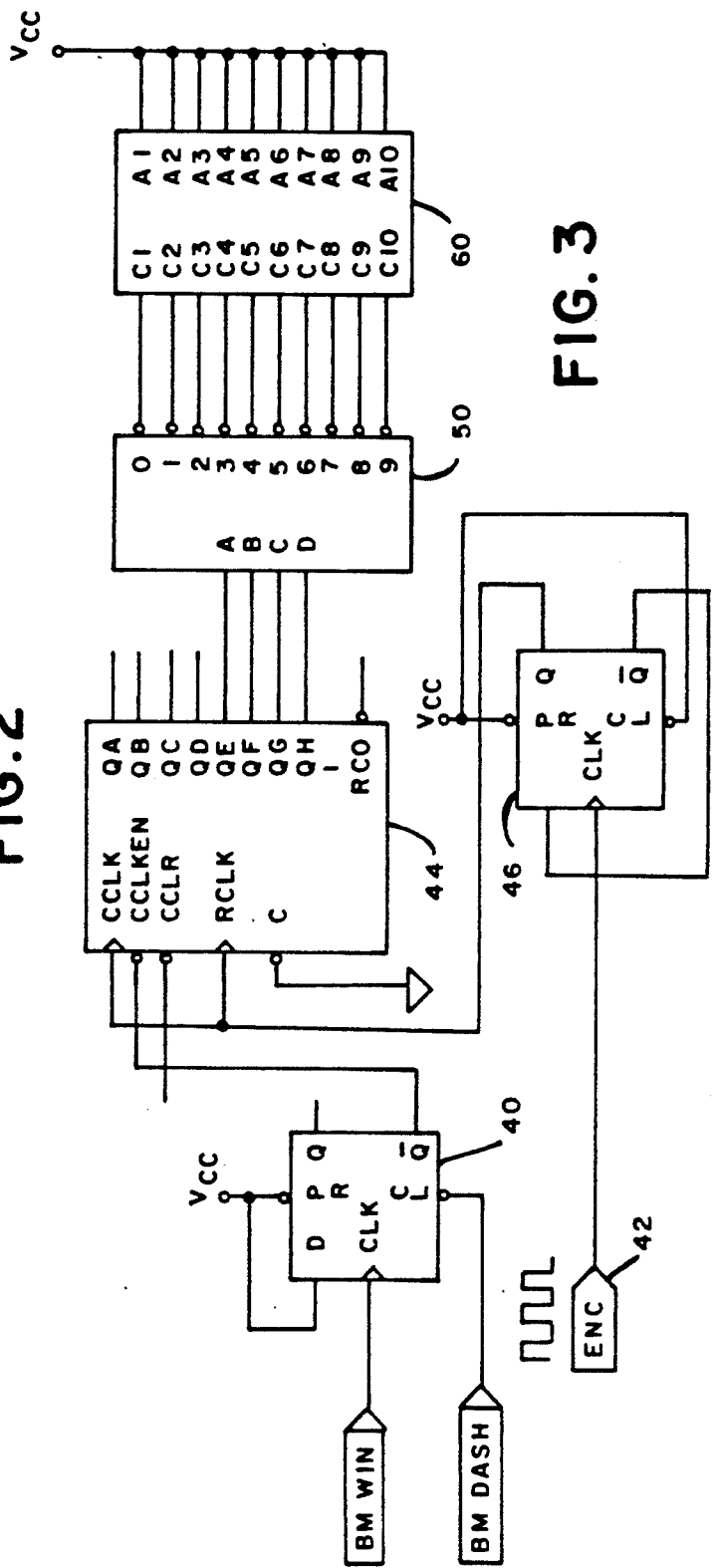
FIG. 3 is a schematic of a circuit for determining the location of the benchmark code in accordance with the present invention.

Referring now to FIG. 3, in accordance with the present invention there is shown a schematic of a circuit in the optical scanning system 18 (FIG. 1) which displays a count representing the location of benchmark code 38 printed on document 30 within detection window W (FIG. 2). The CLK input of FLIP-FLOP 40 is connected to the benchmark window signal 100. A benchmark dash signal is connected to the CL input of FLIP-FLOP 40. The PR and D inputs of FLIP-FLOP 40 are connected to the Vcc supply voltage. The $\overline{Q}$ output of FLIP-FLOP 40 is connected to the CCLKEN input of counter 44. The CCLK and RCLK inputs of counter 44 are connected to the Q output of FLIP-FLOP 46. The Clk input of FLIP-FLOP 46 is connected to the encoder 14 (FIG. 1) pulse signals 42. The $\overline{Q}$ output of FLIP-FLOP 46 is connected to its D input. The Vcc voltage supply is connected to the PR and CL inputs.

The QE-QH outputs of counter 44 are connected to the A-D inputs respectively of decoder 50. The 0-9 outputs of decoder 50 are connected to the C1-C10 inputs of a 10-bar LED 60.

The FLIP-FLOP 40 is triggered by the leading edge 32 of benchmark window W (FIG. 2) which is generated by the optical scanning system 18 (FIG. 1). This results in a benchmark pulse at the output of FLIP-FLOP 40. The benchmark pulse at the output of FLIP-FLOP 40 is terminated by the leading edge of the benchmark dash 38. Thus, the benchmark pulse width is indicative of the location of the benchmark dash 38 in the benchmark window W. The benchmark pulse from the output of FLIP-FLOP 40 enables counter 44 which has is incremented by the output of FLIP-FLOP 46. At the end of the benchmark pulse, the counter will contain the number of encoder pulses between the lead edge of the detection window and the lead edge of the benchmark. This binary value is converted to a decimal value by a 4-line to 10-line decoder 50. In this manner, the detected benchmark dash is detected and processed so as to provide a relative position indication on a 10 bar light emitting diode (LED) 60.

In operation, the lead edge of the benchmark window W enables FLIP-FLOP 40 which in turn enables counter 44. The counter increments a count for each "n" of the encoder 14 pulses. In the preferred embodiment of the present invention n equals 2. The "n") is selected so that the 10 bars of LED 60 represent a complete benchmark window. When the benchmark dash 38 is detected, the lead edge of the detected signal clears FLIP-FLOP 40 which disables counter 44. Then the count existing in counter 44 is loaded into the decoder 50. The output of decoder 50 is displayed in LED 60. The relative position of the benchmark dash within that window is indicated by one of the bars of a 10 bar LED display being illuminated. This provides a visual indication of the relative position of the benchmark dash in the benchmark window.

In the preferred embodiment of the present invention, an operator performs an initialization of the optical scanning system when the benchmark dash 38 is not approximately in the center of benchmark window W. This is accomplished by means of inputting at the operator interface 22 (FIG. 2) an adjustment of the benchmark window position relative to the leading edge of document 30. It will be appreciated by those skilled in the art that an automatic adjustment can be implemented at the machine control system or the optical scanning system.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. In an optical scanning system including a dash code scanner for scanning a benchmark code printed on a document being transported through a paper handling machine, an improvement to initializing the optical scanning system relative to the location of the benchmark code in an electrically adjustable benchmark window, the improvement comprising:

means for sensing a lead edge of a benchmark window;

scanner means for detecting a benchmark code;

means for generating a first signal beginning at the lead edge of the benchmark window and ending at the detection of the benchmark code;

means for deriving a count indicative of a number of encoder pulses between the lead edges of the benchmark window and the benchmark code; and means for displaying said count on an LED display.

2. The improvement of claim 1 wherein said count deriving means includes a counter enabled by said first signal and incremented by said encoder pulses.

3. The improvement of claim 2 wherein output of said counter is sent to a decoder and the output of said decoder is sent to a 10-bar LED display.

4. A method of initializing an optical scanning system by centering a benchmark code in an electrically adjustable benchmark window, the benchmark code being scanned by the optical scanning system while being transported through a paper handling machine, comprising the steps of:

providing an encoder for generating timing pulses for the paper handling machine as a plurality of documents are processed therethrough;

conveying a document containing a benchmark code to be scanned past a scanning device of the optical scanning system;

enabling a counter at the lead edge of the electrically adjustable benchmark window;

incrementing the counter once for every n encoder pulses;

disabling the counter when the scanning device detects the benchmark code;

displaying the count of the counter in a LED display; and adjusting the location of the benchmark window so that the benchmark code is substantially centered in the benchmark window based on the count displayed on the LED display.

* * * * *